United States Patent
Mei et al.

(10) Patent No.: US 10,038,368 B2
(45) Date of Patent: Jul. 31, 2018

(54) POWER FACTOR CORRECTION DEVICE AND CONTROLLING METHOD THEREOF, AND ELECTRONIC DEVICE

(71) Applicant: Murata Manufacturing Co., Ltd., Nagaokakyo-shi, Kyoto-fu (JP)

(72) Inventors: Chun Mei, Wuhan (CN); Zhou Chen, Wuhan (CN); Fangshun Zhu, Wuhan (CN)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 15/681,615

(22) Filed: Aug. 21, 2017

(65) Prior Publication Data

US 2018/0062504 A1  Mar. 1, 2018

(30) Foreign Application Priority Data

Aug. 31, 2016 (CN) .......................... 2016 1 0792617

(51) Int. Cl.
*H02M 1/42* (2007.01)
*G05F 1/70* (2006.01)

(52) U.S. Cl.
CPC ............ *H02M 1/4233* (2013.01); *G05F 1/70* (2013.01)

(58) Field of Classification Search
CPC .... H02M 1/42; H02M 1/4208; H02M 1/4233; H02M 1/4241; H02M 1/4225; G05F 1/70
See application file for complete search history.

(56) References Cited

U.S. PATENT DOCUMENTS

| | | | |
|---|---|---|---|
| 9,001,537 B2* | 4/2015 | Jin | H02M 1/4233 363/53 |
| 2012/0293141 A1 | 11/2012 | Zhang et al. | |
| 2013/0257392 A1* | 10/2013 | Yan | H02M 1/4233 323/210 |
| 2014/0056045 A1* | 2/2014 | Yan | H02M 1/4233 363/126 |
| 2016/0134185 A1* | 5/2016 | Wang | H02M 1/42 323/235 |
| 2016/0241132 A1* | 8/2016 | Lin | H02M 1/4225 |

FOREIGN PATENT DOCUMENTS

CN          101707441 B        6/2012

* cited by examiner

*Primary Examiner* — Matthew Nguyen
(74) *Attorney, Agent, or Firm* — Keating & Bennett, LLP

(57) ABSTRACT

PFC device and controlling method thereof, and an electronic device are provided. The device includes: first and second input terminals configured to receive AC input signal including alternating positive and negative half-cycles; an output terminal configured to provide output signal; an inductor a first terminal of which is coupled with the first input terminal; a first bridge arm including first and second switch components whose first connection point is coupled with second terminal of the inductor; a second bridge arm including third and fourth switch components whose second connection point is coupled with the second input terminal; a first current sampling unit configured to sample falling edge of an inductor current flowing through the inductor; a switch controlling unit configured to generate switch control signal based on sampling result to control the first and second switch components to change switch status. Influence of parasitic parameters on the circuit is reduce.

19 Claims, 10 Drawing Sheets

US 10,038,368 B2

POWER FACTOR CORRECTION DEVICE AND CONTROLLING METHOD THEREOF, AND ELECTRONIC DEVICE

CROSS-REFERENCE TO RELATED APPLICATIONS

This application claims the benefit of priority to Chinese Patent Application No. 201610792617.0, filed on Aug. 31, 2016, and entitled "POWER FACTOR CORRECTION DEVICE AND CONTROLLING METHOD THEREOF, AND ELECTRONIC DEVICE", the entire disclosure of which is incorporated herein by reference.

TECHNICAL FIELD

The present disclosure generally relates to Power Factor Correction (PFC) technology, and more particularly, to a PFC device and a controlling method thereof, and an electronic device.

BACKGROUND

Power factor (PF) is a parameter used for measuring power consumption efficiency of electrical equipment. To improve the power consumption efficiency, PFC is usually performed to an Alternating Current (AC) input signal before the AC input signal is supplied to the electrical equipment. A PFC device generally increases PF by reducing a phase difference between a voltage and a current.

In existing techniques, a PFC device employs a conventional bridge boost circuit. However, there is a fixed voltage drop in a diode in a rectifier bridge in the circuit, which results in a large loss. As a result, efficiency of the circuit cannot meet requirements.

To overcome the above problems, another existing PFC device employs a bridgeless double boost circuit. However, the circuit requires two sets of boost circuits, which may cause high cost and a relatively large space. In addition, a switching transistor in the circuit is still hard switching, thus, improvement in efficiency is limited.

At present, there is another PFC device where a totem pole circuit is employed. The totem pole circuit uses fewer components to provide increased power density. In addition, a switching transistor in the totem pole circuit is soft switching, so that efficiency is further improved, which is helpful to improve efficiency of the overall machine. Previous totem pole circuits use conventional MOS transistors. Due to reverse recovery effect of a body diode in the conventional MOS transistor, the previous totem pole circuit usually only work in a discontinuous current mode, so that a control strategy is relatively complex. A GaN-based MOS transistor has a higher opening rate and less reverse recovery effect, therefore, a totem pole circuit using the GaN-based MOS transistor can work in the continuous current mode, and thus is prone to be realized.

FIG. 1 schematically illustrates a totem pole circuit in the exiting techniques. Referring to FIG. 1, the circuit includes an inductor L, a first bridge arm 11, a second bridge arm 12 and an output capacitor C. The first bridge arm 11 includes switching transistors Q1 and Q2 which are connected at a first connection point A. The second bridge arm 12 includes switching transistors Q3 and Q4 which are connected at a second connection point B. Further, the switching transistors Q1 and Q2 are primary transistors for controlling charging and discharging of the totem pole circuit, and generally are GaN-based MOS transistors. The switching transistor Q3 is turned on during a positive half-cycle of an AC input signal AC, and the switching transistor Q4 is turned on during a negative half-cycle of the AC input signal AC cycle, so as to perform synchronous rectification.

Referring to FIGS. 2A to 2F, an operation process of the totem pole circuit as shown in FIG. 2 is described below. Referring to 2A, during the positive half-cycle of the AC input signal AC, the switching transistors Q2 and Q4 are turned on, and the switching transistors Q1 and Q3 are turned off. The AC input signal AC is applied to the inductor L, to make an inductor current flowing through the inductor L increased. Referring to 2B, afterwards, the switching transistor Q2 is turned off. Due to a dead time, the switching transistor Q1 is not turned on yet, and the inductor current cannot change suddenly, thus, the current flows though a body diode of the switching transistor Q1 to the output capacitor C. Referring to FIG. 2C, after the dead time, the switching transistor A1 is softly turned on, the inductor L discharges, and the inductor current decreases. During the negative half-cycle of the AC input signal AC, equivalent circuits of the totem pole circuit are shown as FIGS. 2D and 2F. The operation states in the negative half-cycle are similar with the positive half-cycle, only the transistors used for charging and the transistors used for discharging are interchanged, and the synchronous rectification transistor is changed from the switching transistor Q4 to the switching transistor Q3.

To control switching transistors in a totem pole circuit, a control solution is disclosed in a patent with a publication number No. CN101707441B. Two current sampling units are added in a first bridge arm connected with an inductor, where current sampled by the two current sampling units are used for controlling the turn-on and turn-off of the two transistors in the first bridge arm respectively. However, in the patent, one current sampling unit is floating ground connected, that is, the current sampling unit is connected with the ground without through a conductor. Therefore, the circuit may be prone to be affected by parasitic parameters, and inductive interference may be brought to an analog circuit. In addition, the current sampling unit always employs components with great inductance and capacitance to ensure relatively high precision, which causes the current sampling unit to generate parasitic parameters that impact operation effect of the circuit.

Another solution for controlling switching transistors in a totem pole circuit is disclosed in a patent application with publication No. US2012/0293141A1. Specifically, a current transformer is used to detect a current so as to control the switching transistors. However, the current transformer may still bring parasitic parameters that impact the circuit, for example, parasitic inductance. At the moments that the switching transistors are turned on and turned off, the parasitic inductance may generate a relatively large voltage spike, which may cause the circuit to not operate normally.

SUMMARY

Embodiments of the present disclosure provide a PFC device and a controlling method thereof, and an electronic device, which may reduce effect of parasitic parameters on a circuit.

In an embodiment, a PFC device is provided, including: a first input terminal and a second input terminal, configured to receive an AC input signal which includes alternating positive half-cycle and negative half-cycle; an output terminal configured to provide an output signal to a load; an inductor, a first terminal of the inductor being coupled with the first input terminal; a first bridge arm, wherein a first terminal of the first bridge arm is coupled with the output terminal, a second terminal of the first bridge arm is directly or indirectly grounded, the first bridge arm includes a first switch component and a second switch component which are connected in series, and a first connection point of the first switch component and the second switch component is coupled with a second terminal of the inductor; a second bridge arm, wherein a first terminal of the second bridge arm is coupled with the output terminal, a second terminal of the second bridge arm is directly or indirectly grounded, the second bridge arm includes a third switch component and a fourth switch component which are connected in series, and a second connection point of the third switch component and the fourth switch component is coupled with the second input terminal; a first current sampling unit, wherein at least one terminal of the first current sampling unit is grounded, and the first current sampling unit is configured to sample a falling edge of an inductor current flowing through the inductor at least in the negative half-cycle of the AC input signal to obtain a sampling result; and a switch controlling unit, coupled with the first current sampling unit, the first switch component and the second switch component, and configured to generate a switch control signal based on the sampling result to control the first switch component and the second switch component to change a switch status.

In some embodiments, the second terminal of the first bridge arm and the second terminal of the second bridge arm are connected at a third connection point, the output terminal is coupled with a first terminal of an output capacitor, a second terminal of the output capacitor or the third connection point is grounded, a sampling point of the first current sampling unit is disposed between the second terminal of the output capacitor and the third connection point, and the first current sampling unit is further configured to sample the falling edge of the inductor current in the positive half-cycle of the AC input signal.

In some embodiments, the first bridge arm may further include a second current sampling unit, wherein a detection point of the second current sampling unit is disposed between the first connection point and the output terminal, and the second current sampling unit is configured to detect a current flowing through the first switch component, wherein the switch controlling unit is further coupled with the second current sampling unit, and when the second current sampling unit detects that the current flowing through the first switch component exceeds a first predetermined threshold, the switch control signal generated by the switch controlling unit controls the first switch component to be turned off for a predetermined time.

In some embodiments, the second current sampling unit may be a non-inductive current sampling unit.

In some embodiments, the first bridge arm may further include a third current sampling unit, wherein a detection point of the third current sampling unit is disposed between the first connection point and the third connection point, and the third current sampling unit is configured to detect a current flowing through the second switch component, wherein the switch controlling unit is further coupled with the third current sampling unit, and when the third current sampling unit detects that the current flowing through the second switch component exceeds a second predetermined threshold, the switch control signal generated by the switch controlling unit controls the second switch component to be turned off for a predetermined time.

In some embodiments, a sampling point of the first current sampling unit is disposed between the second terminal of the first bridge arm and the second terminal of the second bridge arm, and the second terminal of the first bridge arm or the second terminal of the second bridge arm is grounded.

In some embodiments, during the positive half-cycle of the AC input signal, the first current sampling unit is configured to detect a current flowing through the second switch component, wherein when the first current sampling unit detects that the current flowing through the second switch component exceeds a third predetermined threshold, the switch control signal generated by the switch controlling unit controls the second switch component to be turned off for a predetermined time.

In some embodiments, the first bridge arm may further include a second current sampling unit, wherein a detection point of the second current sampling unit is disposed between the first connection point and the output terminal, and the second current sampling unit is configured to detect a current flowing through the first switch component, wherein the switch controlling unit is further coupled with the second current sampling unit, and when the second current sampling unit detects that the current flowing through the first switch component exceeds a fourth predetermined threshold, the switch control signal generated by the switch controlling unit controls the first switch component to be turned off for a predetermined time.

In some embodiments, the second current sampling unit may be a non-inductive current sampling unit.

In some embodiments, when the first current sampling unit detects that the inductor current decreases, the switch controlling unit is configured to: sample at a time point after a predetermined time to obtain the sampling result; calculate a time point at which the first switch component and the second switch component change the switch status next time; and generate the switch control signal to control the first switch component and the second switch component to change the switch status at the time point.

In an embodiment, an electronic device is provided, including any one of the above PFC devices.

In an embodiment, a method for controlling a PFC device is provided, wherein the PFC device includes: a first input terminal and a second input terminal, configured to receive an AC input signal which includes alternating positive half-cycle and negative half-cycle; an output terminal configured to provide an output signal to a load; an inductor, a first terminal of the inductor being coupled with the first input terminal; a first bridge arm, wherein a first terminal of the first bridge arm is coupled with the output terminal, a second terminal of the first bridge arm is directly or indirectly grounded, the first bridge arm includes a first switch component and a second switch component which are connected in series, and a first connection point of the first switch component and the second switch component is coupled with a second terminal of the inductor; and a second bridge arm, wherein a first terminal of the second bridge arm is coupled with the output terminal, a second terminal of the second bridge arm is directly or indirectly grounded, the second bridge arm includes a third switch component and a fourth switch component which are connected in series, and a second connection point of the third switch component and the fourth switch component is coupled with the second input terminal, and the method may include: sampling a falling edge of an inductor current flowing through the inductor at least in the negative half-cycle of the AC input signal to obtain a sampling result; and generating a switch control signal based on the sampling result to control the first switch component and the second switch component to change a switch status.

Embodiments of the present disclosure may provide following advantages. In the PFC device provided in embodiments of the present disclosure, the first current sampling unit at least one terminal of which is grounded is employed. The first current sampling unit samples the falling edge of the inductor current at least in the negative half-cycle of the AC input signal to obtain the sampling result, and turn-on and turn-off of the first switch component and the second switch component are controlled according to the sampling result. In some embodiments, the sampling result for generating the switch control signal may further include a result of sampling a rising edge or a falling edge of the inductor current in the positive half-cycle of the AC input signal. As the first current sampling unit is grounded, compared with the existing techniques where a ground potential of floating ground varies due to parasitic parameters, the first current sampling unit has a stable ground potential which does not impact operation effect of the whole circuit and improves stability in a high-voltage state.

Further, the second terminal of the first bridge arm and the second terminal of the second bridge arm are connected at the third connection point, the second terminal of the output capacitor or the third connection point is grounded, and the sampling point of the first current sampling unit is disposed between the second terminal of the output capacitor and the third connection point, so that the first current sampling unit may sample the falling edge of the inductor current in the positive half-cycle and the negative half-cycle of the AC input signal, and the sampling result obtained in the positive half-cycle and the negative half-cycle may be used for generating the switch control signal to control the first switch component and the second switch component.

Alternatively, the sampling point of the first current sampling unit is disposed between the second terminal of the first bridge arm and the second terminal of the second bridge arm, and the second terminal of the first bridge arm or the second terminal of the second bridge arm is grounded, so that the first current sampling unit may sample the falling edge of the inductor current in the negative half-cycle of the AC input signal, and the sampling result is used for generating the switch control signal to control the first switch component and the second switch component, and the first current sampling unit may detect the current flowing through the second switch component in the positive half-cycle of the AC input signal, and the detection result is used for turning off the second switch component for protection.

DETAILED DESCRIPTION

In order to clarify the object, solutions and advantages of embodiments of the present disclosure, embodiments of present disclosure will be described clearly in detail in conjunction with accompanying drawings.

First Embodiment

Figure 3:
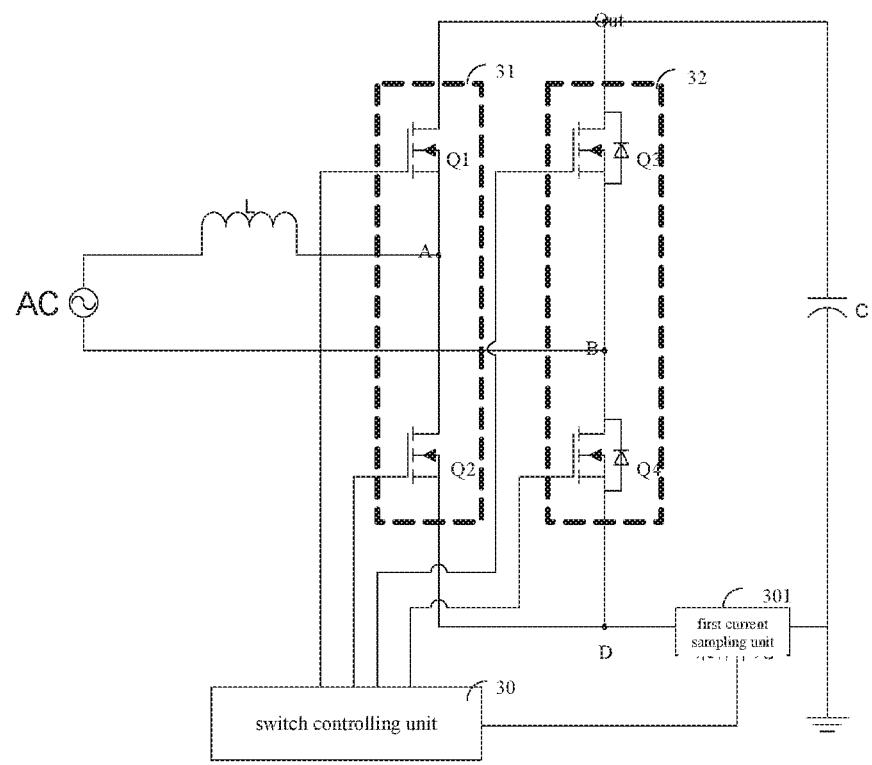
FIG. 3 schematically illustrates a circuit structural diagram of a PFC device according to a first embodiment.

FIG. 3 schematically illustrates a circuit structural diagram of a PFC device according to a first embodiment. Referring to FIG. 3, the PFC device employs a structure based on a totem pole circuit, and may include a first input terminal, a second input terminal, an output terminal Out, an inductor L, a first bridge arm 31, a second bridge arm 32, a first current sampling unit 301 and a switch controlling unit 30.

The first input terminal and the second input terminal are configured to receive an AC input signal which includes alternating positive half-cycle and negative half-cycle. For example, the AC input signal is a mains signal with an amplitude of 220V and a frequency of 50 Hz. The output terminal Out is configured to provide an output signal to a load (not shown in FIG. 3). A first terminal of the inductor L is coupled with the first input terminal.

A first terminal of the first bridge arm 31 is coupled with the output terminal Out, and a second terminal of the first bridge arm 31 is connected with a second terminal of the second bridge arm 32 at a third connection point D. The first bridge arm 31 includes a first switch component Q1 and a second switch component Q2 which are connected in series, and a first connection point A of the first switch component Q1 and the second switch component Q2 is coupled with a second terminal of the inductor L. The first switch component Q1 and the second switch component Q2 may be MOS transistors, preferably MOS transistors based on a GaN material.

A first terminal of the second bridge arm 32 is coupled with the output terminal Out, and the second terminal of the second bridge arm 32 is connected with the second terminal of the first bridge arm 31 at the third connection point D. The second bridge arm 32 includes a third switch component Q3 and a fourth switch component Q4 which are connected in series, and a second connection point B of the third switch component Q3 and the fourth switch component Q4 is coupled with the second input terminal. The third switch component Q3 and the fourth switch component Q4 may be MOS transistors or diodes. In the embodiment shown in FIG. 3, the third switch component Q3 and the fourth switch component Q4 are MOS transistors.

At least one terminal of the first current sampling unit 301 is grounded, and the first current sampling unit 301 is configured to sample a falling edge of an inductor current flowing through the inductor L in the positive half-cycle and the negative half-cycle of the AC input signal to obtain a sampling result which is transmitted to the switch controlling unit 30. A sampling point of the first current sampling unit 301 is disposed between a second terminal of an output capacitor C and the third connection point D, a first terminal of the output capacitor C is coupled with the output terminal Out, and the output capacitor C may be configured to be connected with a load in parallel.

The third connection point D or the second terminal of the output capacitor C is grounded, through a conductor or a resistive component. In the embodiment shown in FIG. 3, the second terminal of the output capacitor C is grounded, so that the load is directly grounded to receive relatively stable output signals.

It should be noted that the connection way of the first current sampling unit 301 in FIG. 3 is only schematic, and in practice, the connection way may be different depending on components to be used. For example, the first current sampling unit 301 may be a sampling resistor, a first terminal of the sampling resistor is connected to the third connection point D, a second terminal of the sampling resistor is connected to the second terminal of the output capacitor C, and the first terminal of the sampling resistor as the output terminal of the sampling result is connected to the switch controlling unit 30. Alternatively, the first current sampling unit 301 may be a current transformer, a primary winding in the current transformer is connected in series between the third connection point D and the second terminal of the output capacitor C, a first terminal of a secondary winding in the current transformer which is coupled to the primary winding is connected to a preset potential (e.g., ground), and a second terminal of the secondary winding as the output terminal of the sampling result is connected to the switch controlling unit 30.

The switch controlling unit 30 is coupled with the first current sampling unit 301, the first switch component Q1 and the second switch component Q2, and configured to generate a switch control signal based on the sampling result of the first current sampling unit 301 to control the first switch component Q1 and the second switch component Q2 to change a switch status. Specifically, the switch control signal generated by the switch controlling unit 30 may control the first switch component Q1 and the second switch component Q2 to switch between turn-on and turn-off. In addition, the switch controlling unit 30 may also control a switch status of the third switch component Q3 and the fourth switch component Q4. The switch controlling unit 30 may be implemented using a variety of dedicated or general purpose circuits, for example, the switch controlling unit 30 may be implemented using a Digital Signal Processor (DSP).

Figure 4A:
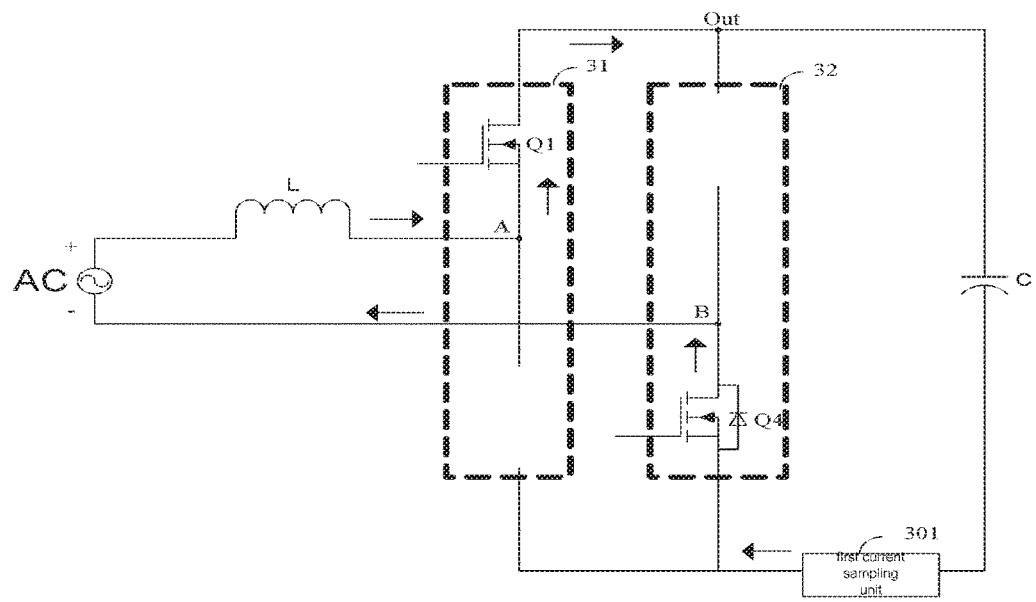
FIG. 4A schematically illustrates an equivalent circuit diagram of the PFC device as shown in FIG. 3 in a positive half-cycle of an AC input signal.
Figure 4B:
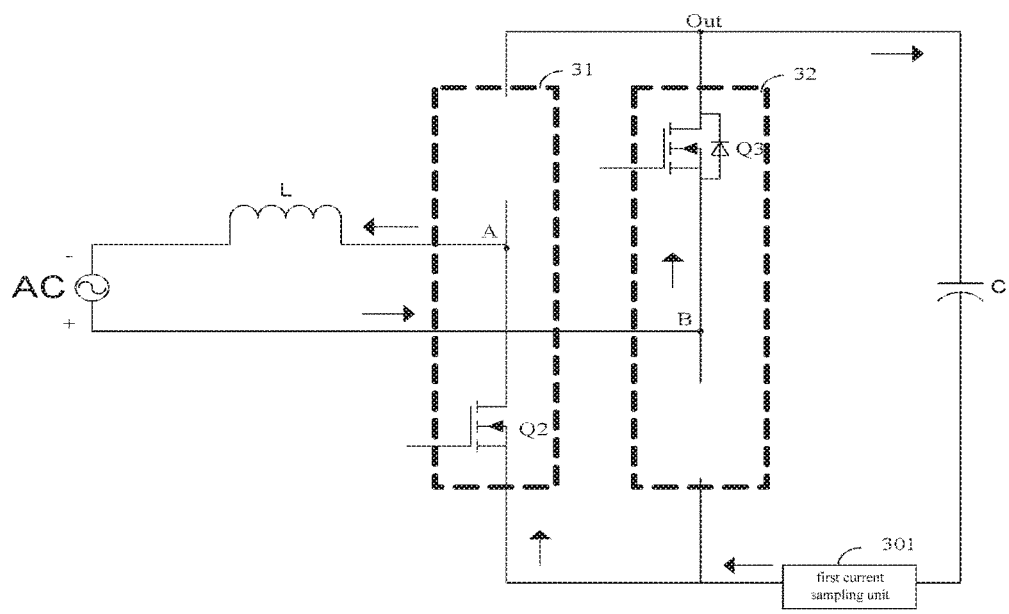
FIG. 4B schematically illustrates an equivalent circuit diagram of the PFC device as shown in FIG. 3 in a negative half-cycle of an AC input signal.

An operation process of the PFC device shown in FIG. 3 is described in conjunction with FIGS. 4A and 4B. To illustrate equivalent circuits more clearly and simply, the switch controlling unit, turned-off switch components and ground points are not illustrated in FIGS. 4A and 4B.

Referring to FIG. 4A, the first switch component Q1 and the fourth switch component Q4 are turned on, and other switch components are turned off at the current falling edge during the positive half-cycle of the AC input signal AC. The current flows out from the first input terminal and returns to the second input terminal via the inductor L, the first switch component Q1, the output capacitor C, the first current sampling unit 301 and the fourth switch component Q4. This process is a discharging process of the inductor L, and the first current sampling unit 301 may sample the falling edge of the inductor current.

Referring to FIG. 4B, at the current falling edge during the negative half-cycle of the AC input signal AC, the second switch component Q2 and the third switch component Q3 are turned on, and other switch components are turned off at the falling edge in the negative half-cycle of the AC input signal AC. The current flows out from the second input terminal and returns to the first input terminal via the third switch component Q3, the output capacitor C, the first current sampling unit 301, the second switch component Q2 and the inductor L. This process is also the discharging process of the inductor L, and the first current sampling unit 301 may sample the falling edge of the inductor current.

From above, referring to FIGS. 3, 4A and 4B, the first current sampling unit 301 may sample the falling edge of the inductor current in the positive half-cycle and the negative half-cycle of the AC input signal AC, and transmit the sampling result to the switch controlling unit 30 to generate the switch control signal for controlling the first switch component Q1 and the second switch component Q2. The first current sampling unit 301 samples the falling edge of the inductor current, and at least one terminal of the first current sampling unit 301 is grounded, which, compared with the floating ground connection mode, may minimize influence of parasitic parameters on the circuit. Therefore, the first current sampling unit 301 may be a high-precision component with relatively large inductance and capacitance, so as to improve sampling precision without being impacted by parasitic parameters.

In addition, according to FIGS. 4A and 4B, directions of the current flowing through the first current sampling unit 301 in the positive half-cycle and the negative half-cycle of the AC input signal AC are the same, and its measurement range is from zero to a current peak value, thus, a current sampling component with a narrow measurement range is conducive to improve precision.

Still referring to FIG. 3, the switch controlling unit 30 may generate the switch control signal based on the sampling result using various appropriate methods. For example, when the first current sampling unit 301 detects that the inductor current starts to decrease, the switch controlling unit 30 samples the falling edge of the inductor current at a time point after a predetermined time to obtain the sampling result, calculates at which the first switch component Q1 and the second switch component Q2 change the switch status next time, and generates the switch control signal to control the first switch component Q1 and the second switch component Q2 to change the switch status at the time point, where the time point after the predetermined time may preferably be a midpoint of the falling edge of the inductor current or near the midpoint. For the positive and negative half-cycles of the AC input signal AC, the predetermined time for obtaining the sampling time point may be different.

Figure 5:
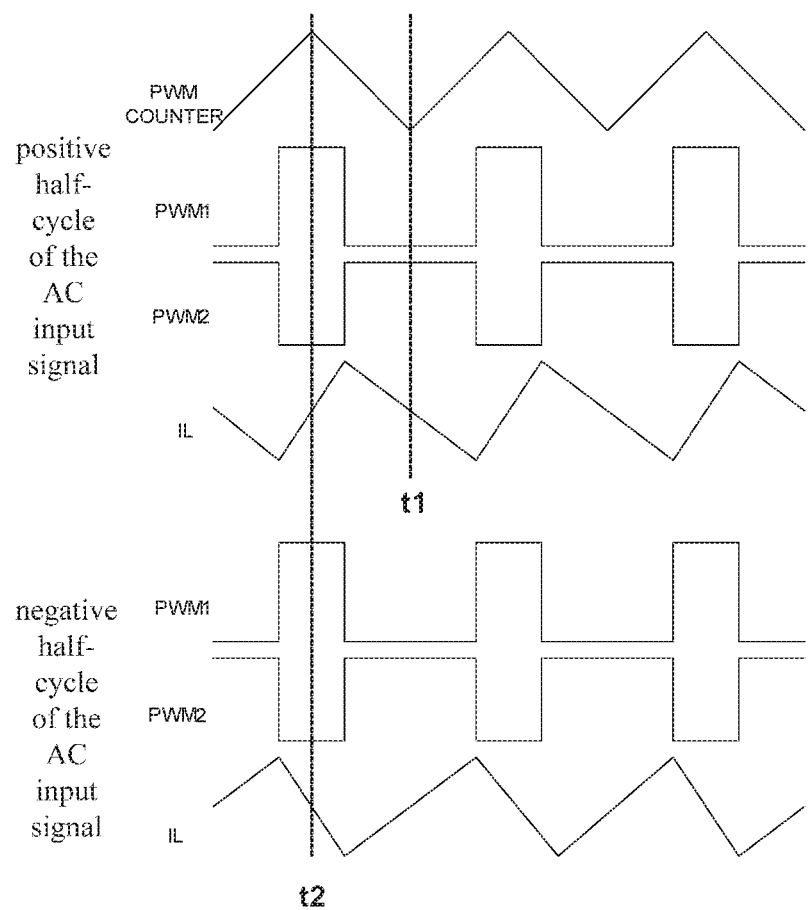
FIG. 5 schematically illustrates an oscillogram of an operation signal of the PFC device as shown in FIG. 3.

Referring to FIGS. 3 and 5, as a non-limiting example, the switch controlling unit 30 may control the first switch component Q1 and the second switch component Q2 in such a manner that a pulse width modulation signal is used. Specifically, the first switch component Q1 and the second switch component Q2 are controlled by using waveform-complementary pulse width modulation signals PWM1 and PWM2, respectively. Generation of the pulse width modulation signals PWM1 and PWM2 may be realized based on a count value of the PWM counter (PWM COUNTER). In FIG. 5, PWM COUNTER represents the count value of the PWM counter, PWM1 represents the pulse width modulation signal PWM1, PWM2 represents the pulse width modulation signal PWM2, and IL represents the inductor current flowing through the inductor.

In some embodiments, the PWM counter may operate in a continuous increase or decrease mode. When the count value is increasing and equal to a predetermined value CMPA, the pulse width modulation signal PWM1 is set to be high (for example, logic "1"), and when the count value is reducing and equal to the predetermined value CMPA, the pulse width modulation signal PWM1 is set to be low (for example, logic "0"). Accordingly, the pulse width modulation signal PWM2 may be obtained by negating the pulse width modulation signal PWM1. When the count value of the PWM counter is zero (e.g., at a time point t1) in the positive half-cycle of the AC input signal AC, the first current sampling unit 301 may be triggered to sample the inductor current IL, and when the count value of the PWM counter is a period value (e.g., at a time point t2) in the negative half-cycle of the AC input signal AC, the first current sampling unit 301 may be triggered to sample the inductor current IL. Besides, as there is a need to sample a plurality of data in a counting period of each PWM counter, there may be a certain sampling delay. Further, there may be a waveform oscillation at time points when the first switch component Q1 and the second switch component Q2 are turned off, which results in a sampling error. Therefore, there should be an appropriate time difference between a sampling time point and the turn-off time point. In some embodiments, a duty ratio of the pulse width modulation signals PWM1 and PWM2 may not greater than 90%.

Second Embodiment

Figure 6:
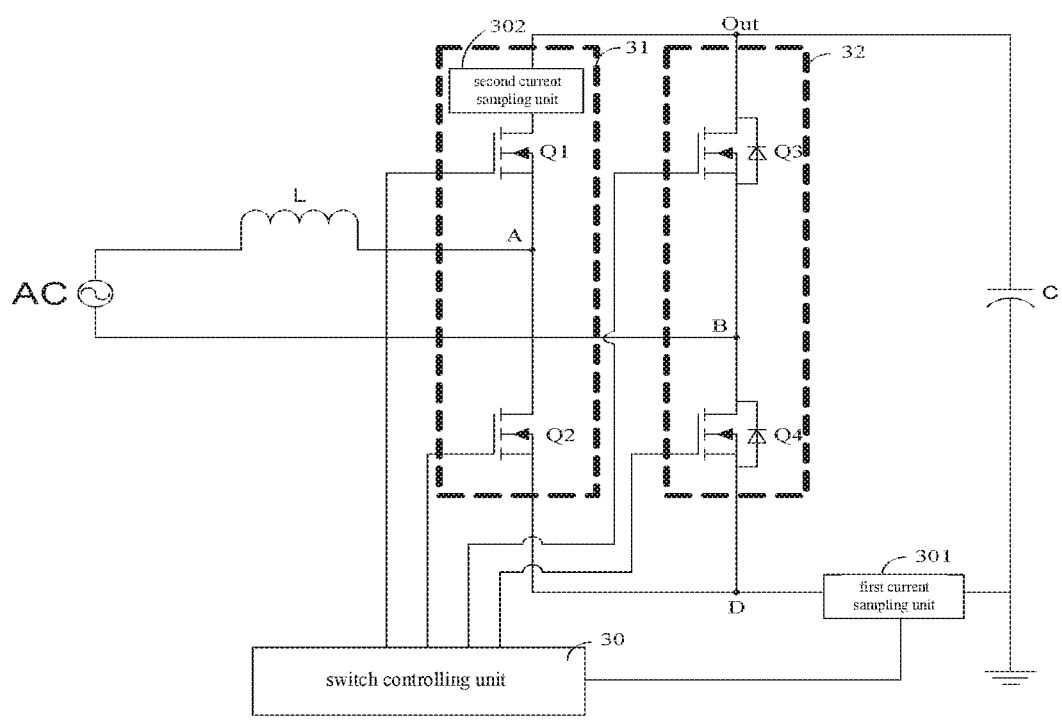
FIG. 6 schematically illustrates a circuit structural diagram of a PFC device according to a second embodiment.

FIG. 6 schematically illustrates a circuit structural diagram of a PFC device according to a second embodiment. Referring to FIG. 6, structures of the PFC device in the second embodiment are similar with the PFC device in the first embodiment. Compared with the first embodiment, the first bridge arm 31 in the PFC device in the second embodiment further includes a second current sampling unit 302.

Further, a detection point of the second current sampling unit 302 is disposed between the first connection point A and the output terminal Out, and the second current sampling unit 302 is configured to detect a current flowing through the first switch component Q1. In FIG. 6, the detection point of the second current sampling unit 302 is disposed between the output terminal Out and the first switch component Q1. Alternatively, the detection point of the second current sampling unit 302 may be disposed between the first switch component Q1 and the first connection point A.

The second current sampling unit 302 is coupled with the switch controlling unit 30. For simplicity, a connection relation between the second current sampling unit 302 and the switch controlling unit 30 is not shown in FIG. 6. When the second current sampling unit 302 detects that the current flowing through the first switch component Q1 exceeds a first predetermine threshold, the switch control signal generated by the switch controlling unit 30 controls the first switch component Q1 to be turned off for at least a predetermined time. In such a manner, over-current protection to the first switch component Q1 can be achieved, and damage to the first switch component Q1 may be avoided as much as possible.

The second current sampling unit 302 is mainly used for over-current protection or over-current monitoring, and requirements on its precision are not so strict. Similar to the first current sampling unit 301, the second current sampling unit 302 may be a variety of appropriate current sampling units, such as a sampling resistor or a sampling chip. Preferably, the second current sampling unit 302 may be a non-inductive current sampling unit, such as various appropriate non-inductive or lowly inductive current sampling chips in the existing techniques. As the second current sampling unit 302 is floating ground connected, parasitic parameters can be reduced by using a non-inductive or lowly inductive current sampling unit, which further reduces influence of the parasitic parameters on the circuit.

Third Embodiment

Figure 7:
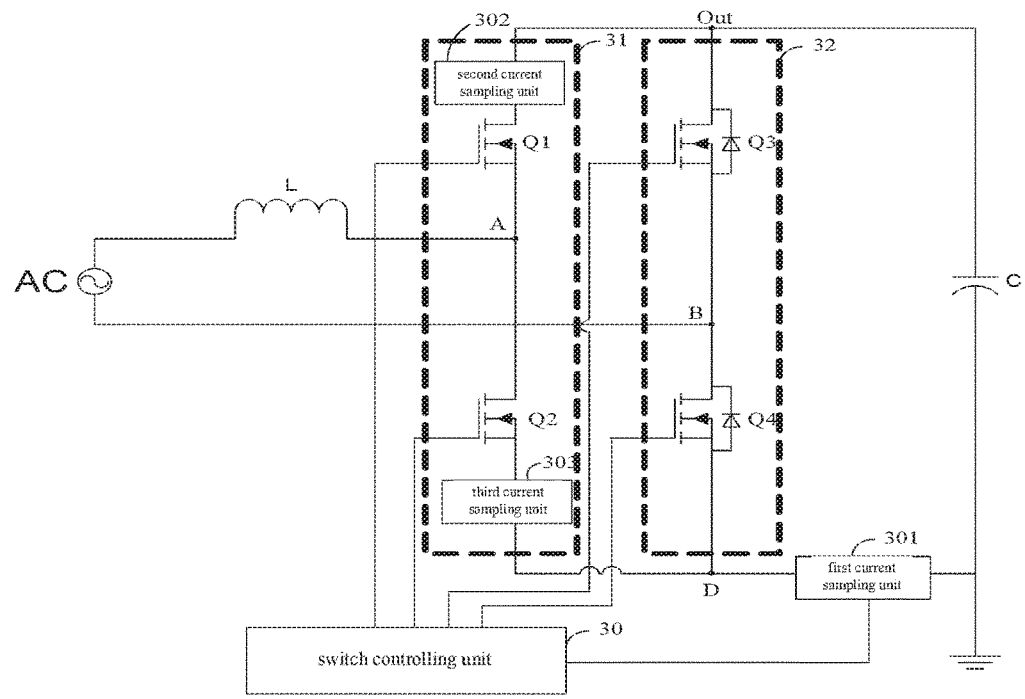
FIG. 7 schematically illustrates a circuit structural diagram of a PFC device according to a third embodiment.

FIG. 7 schematically illustrates a circuit structural diagram of a PFC device according to a third embodiment. Referring to FIG. 7, structures of the PFC device in the third embodiment are similar with the PFC device in the second embodiment. Compared with the second embodiment, the first bridge arm 31 in the PFC device in the third embodiment further includes a third current sampling unit 303.

Further, a detection point of the third current sampling unit 303 is disposed between the first connection point A and the third connection point D, and the third current sampling unit 303 is configured to detect a current flowing through the second switch component Q2. Preferably, the detection point of the third current sampling unit 303 is disposed between the second switch component Q2 and the third connection point D, so that the third current sampling unit 303 may be directly grounded via the third connection point D, or indirectly grounded via the first current sampling unit 301, which, compared with the floating ground connection mode, may reduce influence of parasitic parameters of the third current sampling unit 303 on the circuit. As a non-limiting example, in the embodiment shown in FIG. 7, the second terminal of the output capacitor C is grounded, and the third current sampling unit 303 is indirectly grounded via the first current sampling unit 301.

The third current sampling unit 303 is coupled with the switch controlling unit 30. For simplicity, a connection relation between the third current sampling unit 303 and the switch controlling unit 30 is not shown in FIG. 7. When the third current sampling unit 303 detects that the current flowing through the second switch component Q2 exceeds a second predetermine threshold, the switch control signal generated by the switch controlling unit 30 controls the second switch component Q2 to be turned off for at least a predetermined time. In such a manner, over-current protection to the second switch component Q2 can be achieved, and damage to the second switch component Q2 may be avoided as much as possible.

It should be noted that, in the embodiment shown in FIG. 7, the second current sampling unit 302 and the third current sampling unit 303 are employed to perform over-current protection to the first switch component Q1 and the second switch component Q2, respectively. Alternatively, only the third current sampling unit 303 is employed to perform over-current protection to the second switch component Q2, and the second current sampling unit 302 is omitted, so as to simplify the structures of the circuit.

Fourth Embodiment

Figure 8:
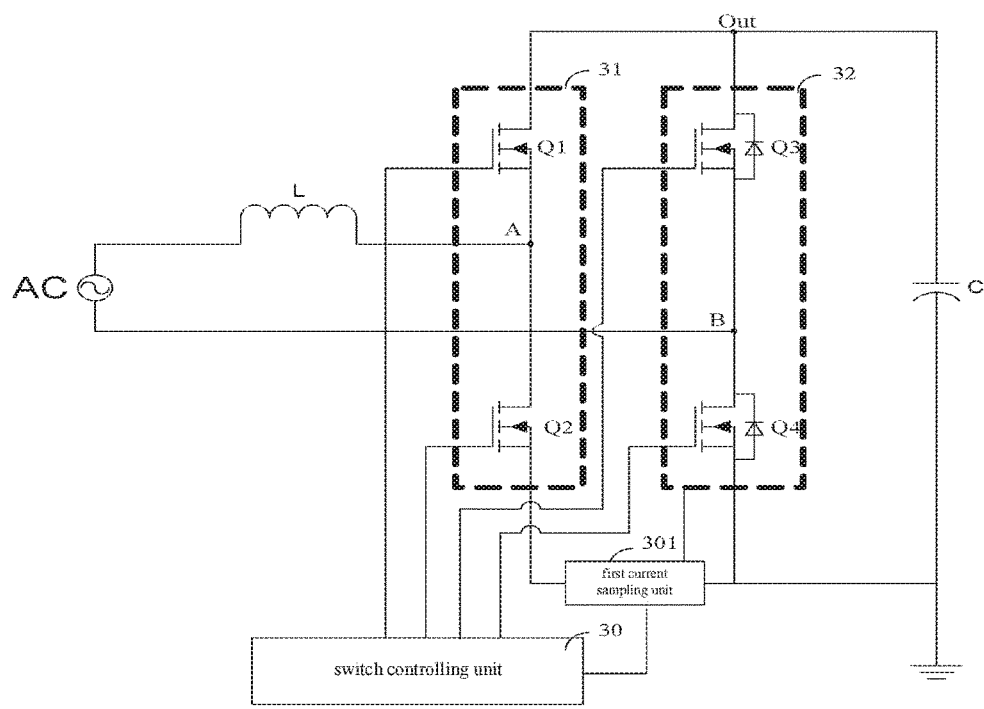
FIG. 8 schematically illustrates a circuit structural diagram of a PFC device according to a fourth embodiment.

FIG. 8 schematically illustrates a circuit structural diagram of a PFC device according to a fourth embodiment. Referring to FIG. 8, structures of the PFC device in the fourth embodiment are similar with the PFC device in the first embodiment. Differences between the first embodiment and the fourth embodiment lie in that, the sampling point of the first current sampling unit 301 is disposed between the second terminal of the first bridge arm 31 and the second terminal of the second bridge arm 32. Differences between the first embodiment and the fourth embodiment further include the ground point. Specifically, the second terminal of the first bridge arm 31 or the second terminal of the second bridge arm 32 is grounded. In the embodiment shown in FIG. 8, the second terminal of the second bridge arm 32 is connected with the second terminal of the output capacitor C and grounded, thereby directing the load to ground so that the load can receive a relatively stable output signal.

It should be noted that the connection way of the first current sampling unit 301 in FIG. 8 is only schematic, and in practice, the connection way may be different depending on components to be used. For example, the first current sampling unit 301 may be a sampling resistor, a first terminal of the sampling resistor is connected to the second terminal of the first bridge arm 31, a second terminal of the sampling resistor is connected to the second terminal of the second bridge arm 32, and the first terminal of the sampling resistor as the output terminal of the sampling result is connected to the switch controlling unit 30. Alternatively, the first current sampling unit 301 may be a current transformer, a primary winding in the current transformer is connected in series between the first terminal of the first bridge arm 31 and the second terminal of the second bridge arm 32, a first terminal of a secondary winding in the current transformer which is coupled to the primary winding is connected to a preset potential (e.g., ground), and a second terminal of the secondary winding as the output terminal of the sampling result is connected to the switch controlling unit 30.

Similar to the first embodiment, in the fourth embodiment, the first current sampling unit 301 may sample the falling edge of the inductor current in the negative half-cycle of the AC input signal, and the switch control signal is generated based on the sampling result. At least one terminal of the first current sampling unit 301 is grounded, which, compared with the floating ground connection mode, may minimize influence of parasitic parameters on the circuit. Therefore, the first current sampling unit 301 may be a high-precision component with relatively large inductance and capacitance, so as to improve sampling precision without being impacted by parasitic parameters.

During the negative half-cycle of the AC input signal AC, the first current sampling unit 301 may sample the falling edge of the inductor current, and the resulting sampling result may be provided to the switch controlling unit 30 to generate a switch control signal, while during the positive half-cycle of the AC input signal AC, the first current sampling unit 301 may detect the current flowing through the second switch component Q2, and the resulting detection result may be provided to the switch controlling unit 30. When it is detected that the current flowing through the second switch component Q2 exceeds a third predetermined threshold, the switch controlling unit 30 controls the second switch component Q2 to be turned off for at least a predetermined time to achieve over-current protection. By the embodiment, the problem of spike current in the patent application with publication No. US2012/0293141A1 which is described in the background may be solved.

Figure 9A:
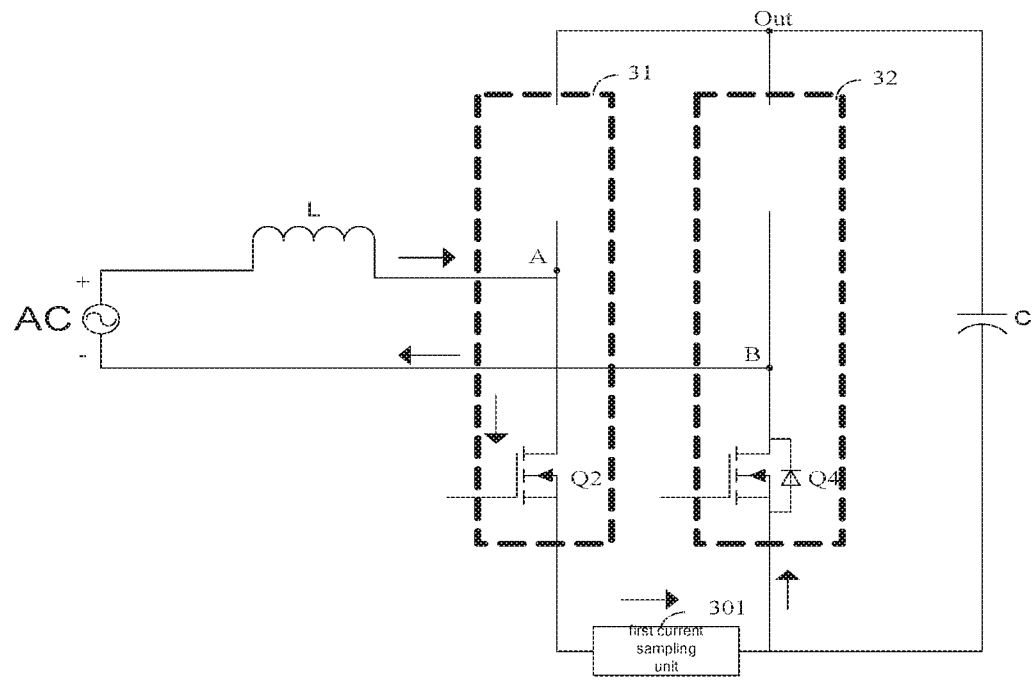
FIG. 9A schematically illustrates an equivalent circuit diagram of the PFC device as shown in FIG. 8 in a positive half-cycle of an AC input signal.
Figure 9B:
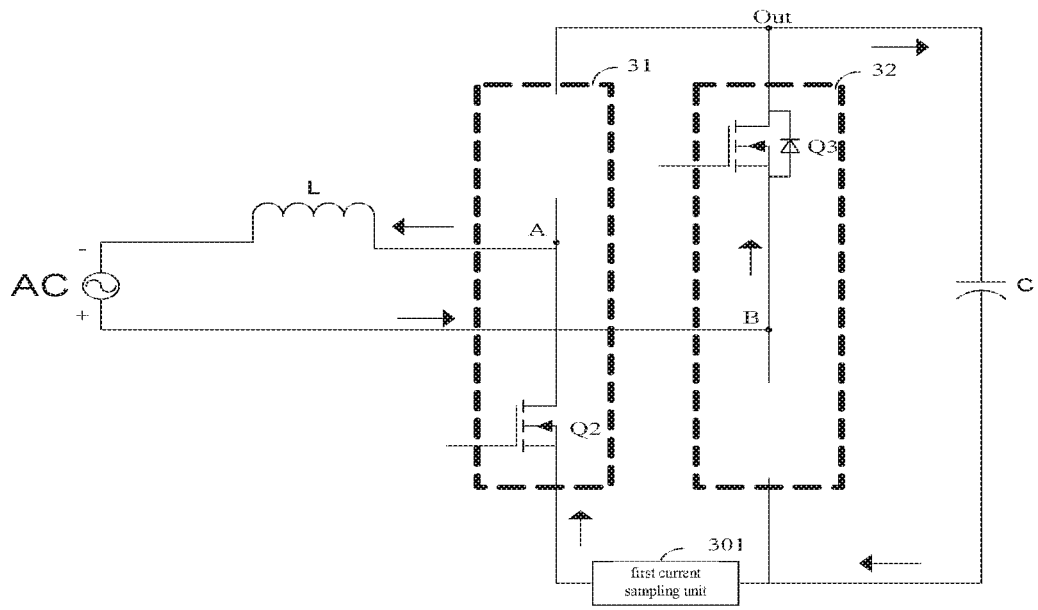
FIG. 9B schematically illustrates an equivalent circuit diagram of the PFC device as shown in FIG. 8 in a negative half-cycle of an AC input signal.

An operation process of the PFC device shown in FIG. 8 is described in detail in conjunction with FIGS. 9A and 9B. To illustrate equivalent circuits more clearly and simply, the switch controlling unit, turned-off switch components and ground points are not illustrated in FIGS. 9A and 9B.

Referring to FIG. 9A, at a current rising edge in the positive half-cycle of the AC input signal AC, the current flows out from the first input terminal and returns to the second input terminal via the inductor L, the second switch component Q2, the first current sampling unit 301 and the fourth switch component Q4, so that the first current sampling unit 301 may detect the current flowing through the second switch component Q2, and the detection result is transmitted to the switch controlling unit 30 to achieve over-current protection to the second switch component Q2. Besides, the current flowing through the second switch component Q2 also flows through the inductor L. Therefore, during the positive half-cycle of the AC input signal AC, the first current sampling unit 301 may sample the inductor current flowing through the inductor L. For example, the first current sampling unit 301 may sample a rising edge of the inductor current flowing through the inductor L during the positive half-cycle of the AC input signal AC, and the sampling result may be transmitted to the switch controlling unit 30 to generate the switch control signal for controlling the first switch component Q1 and the second switch component Q2. Referring to FIG. 4B, at the current falling edge in the negative half-cycle of the AC input signal AC, the current flows out from the second input terminal and returns to the first input terminal via the third switch component Q3, the output capacitor C, the first current sampling unit 301, the second switch component Q2 and the inductor L. This process is the discharging process of the inductor L, the first current sampling unit 301 may sample the falling edge of the inductor current, and the sampling result may be transmitted to the switch controlling unit 30 to generate the switch control signal.

Besides, according to FIGS. 9A and 9B, at the current rising edge in the positive half-cycle of the AC input signal AC and the current falling edge in the negative half-cycle of the AC input signal AC, directions of the current flowing through the first current sampling unit 301 may be opposite, and the corresponding measurement range may be two times of a current peak value. Therefore, in the embodiment, the first current sampling unit 301 may be a current sampling component with a wide measurement range.

Fifth Embodiment

Figure 10:
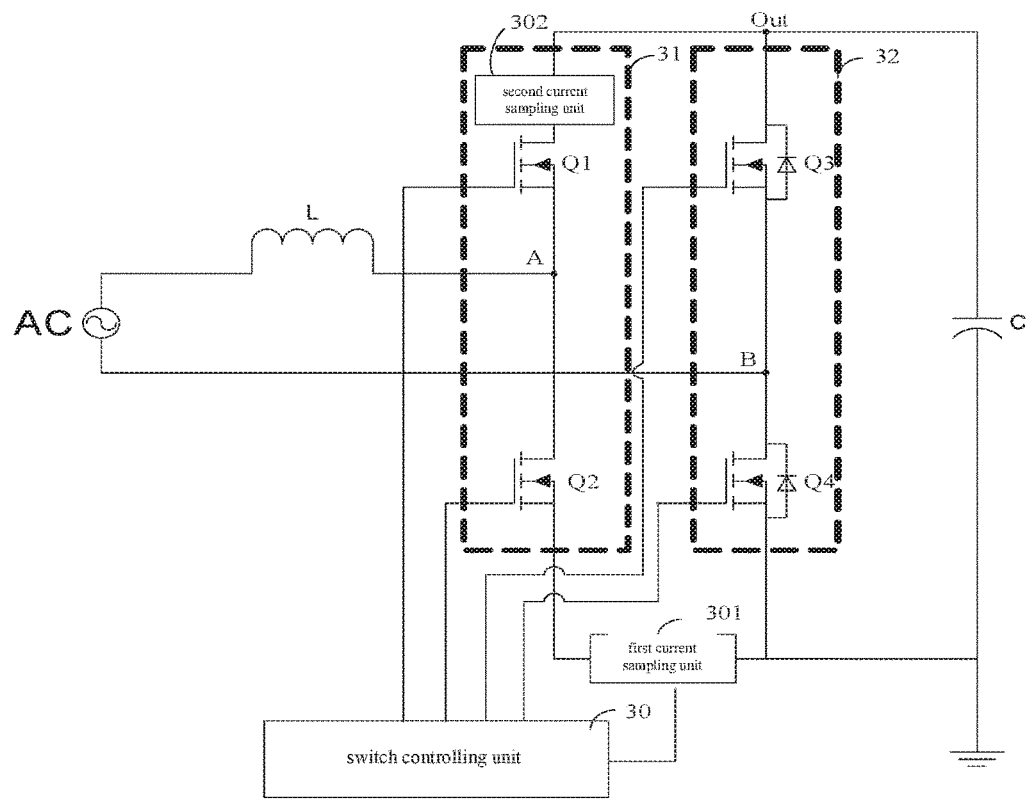
FIG. 10 schematically illustrates a circuit structural diagram of a PFC device according to a fifth embodiment.

FIG. 10 schematically illustrates a circuit structural diagram of a PFC device according to a fifth embodiment. Referring to FIG. 10, structures of the PFC device in the fifth embodiment are similar with the PFC device in the fourth embodiment. Compared with the fourth embodiment, the first bridge arm 31 in the PFC device in the fifth embodiment further includes a second current sampling unit 302.

Further, a detection point of the second current sampling unit 302 is disposed between the first connection point A and the output terminal Out, and the second current sampling unit 302 is configured to detect a current flowing through the first switch component Q1. In FIG. 10, the detection point of the second current sampling unit 302 is disposed between the output terminal Out and the first switch component Q1. Alternatively, the detection point of the second current sampling unit 302 may be disposed between the first switch component Q1 and the first connection point A.

The second current sampling unit 302 is coupled with the switch controlling unit 30. For simplicity, a connection relation between the second current sampling unit 302 and the switch controlling unit 30 is not shown in FIG. 10. When the second current sampling unit 302 detects that the current flowing through the first switch component Q1 exceeds a fourth predetermine threshold, the switch control signal generated by the switch controlling unit 30 controls the first switch component Q1 to be turned off for at least a predetermined time. In such a manner, over-current protection to the first switch component Q1 can be achieved, and damage to the first switch component Q1 may be avoided as much as possible.

Preferably, the second current sampling unit 302 may be a non-inductive current sampling unit. As the second current sampling unit 302 is floating ground connected, parasitic parameters can be reduced by using a non-inductive current sampling unit, which reduces influence of the parasitic parameters on the circuit.

Sixth Embodiment

Figure 11:
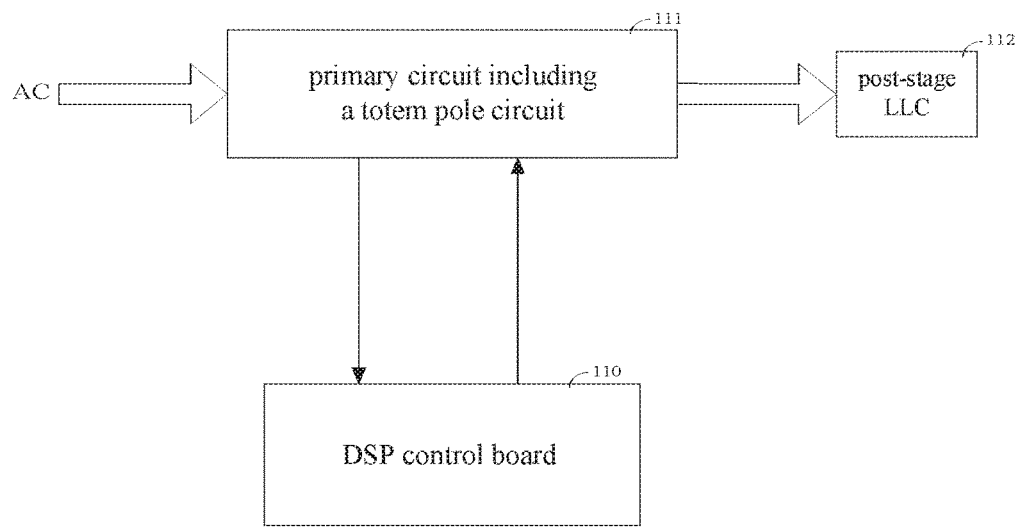
FIG. 11 schematically illustrates a structural diagram of an electronic device according to a sixth embodiment.

FIG. 11 schematically illustrates a structural diagram of an electronic device according to a sixth embodiment. Referring to FIG. 11, the electronic device includes a primary circuit 111 which includes a totem pole circuit, a post-stage resonant circuit (LLC) 112, and a DSP control board 110. The DSP control board 110 is used to implement the switch controlling unit in the first to fifth embodiments described above, and the primary circuit 111 may be circuit structures other than the switch controlling unit. Therefore, the electronic device in the sixth embodiment includes the PFC device in the first to fifth embodiments described above and the post-stage resonant circuit 112. Thus, the AC input signal AC is subjected to PFC by the PFC device and then drives the post-stage resonant circuit 112.

As a non-limiting example, the DSP control board 110 may be implemented based on a chip TMS320F28027, which has characteristics of low cost, high running frequency, small AD sampling delay, and flexible configuration of AD sampling and PWM signal generation way, so that it is prone to satisfy the above-described requirements in the first to fifth embodiments. After power-on, the DSP control board 110 may be configured first, including clock selection, terminal control, RAM code duplication, FLASH configuration, etc., and then peripherals to be used are configured separately. Until all the initialization operations are completed, an infinite loop may start to wait for an interrupt trigger to enter a terminal control program for execution of a control algorithm of the totem pole circuit, i.e., generating a switch control signal.

Further, a process of generating the switch control signal by the DSP control board 110 may be based on, on one hand, a sampling result of a falling edge of an inductor current, and, on the other hand, a sampling result of voltages of the AC input signal and an output signal at an output terminal. In other words, the process for the switch control signal may be controlled by a double loop, where an inner loop current loop causes a current at the output terminal to maintain a same sinusoidal waveform with that of an input voltage of the AC input signal while minimizing a phase difference, and an outer ring voltage loop keeps the voltage at the output stable while adjusting an effective value of the output current supplied to the output terminal according to changes of the AC input signal and a load.

FIG. 11 illustrate a non-limiting example, and the PFC device shown in the first to fifth embodiments described above may be used in any appropriate electronic devices that require PFC.

Seventh Embodiment

Figure 1:
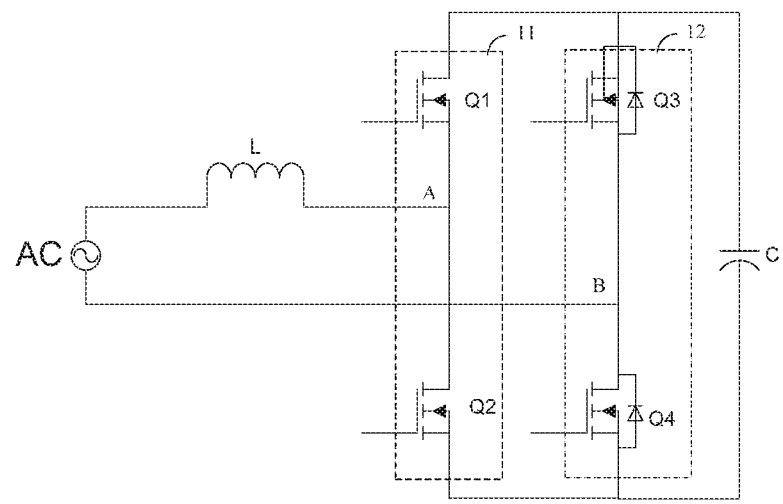
FIG. 1 schematically illustrates a structural diagram of a totem pole circuit in the existing techniques.
Figure 2A:
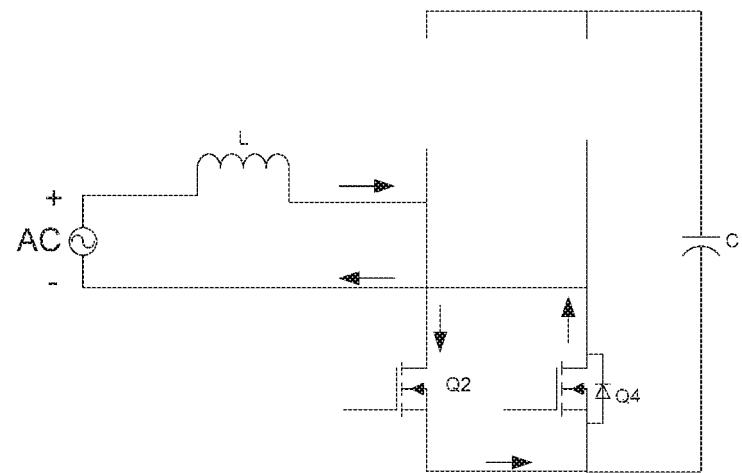
FIGS. 2A to 2F schematically illustrate equivalent circuit diagrams of the totem pole circuit as shown in FIG. 1 in different operation states.
Figure 2B:
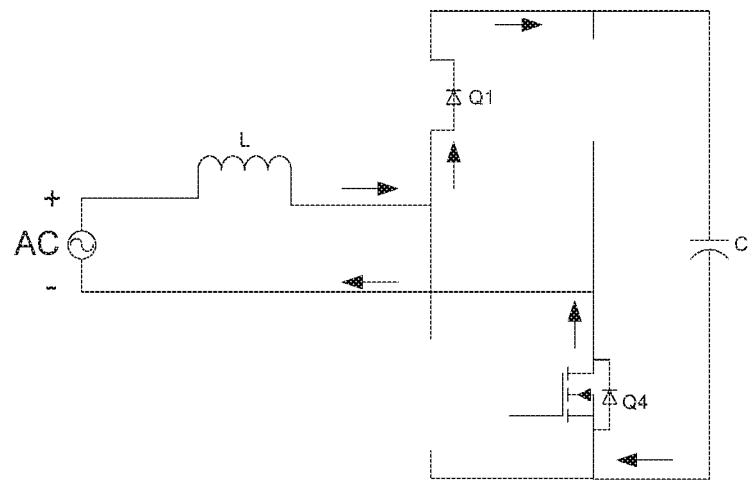
Figure 2C:
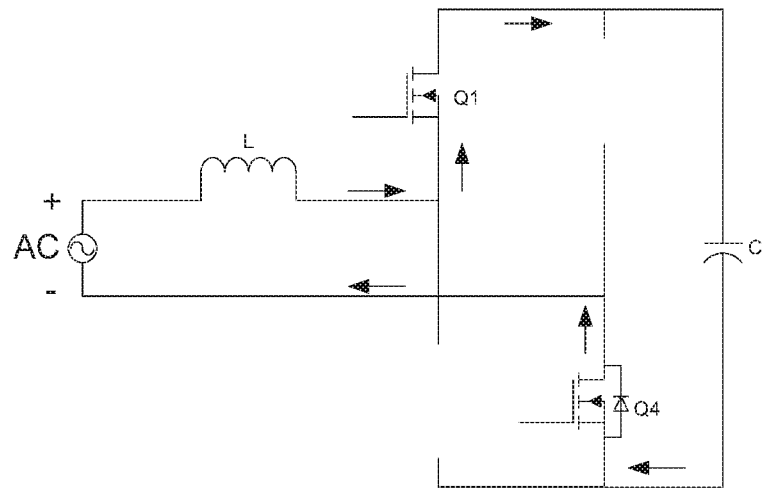
Figure 2D:
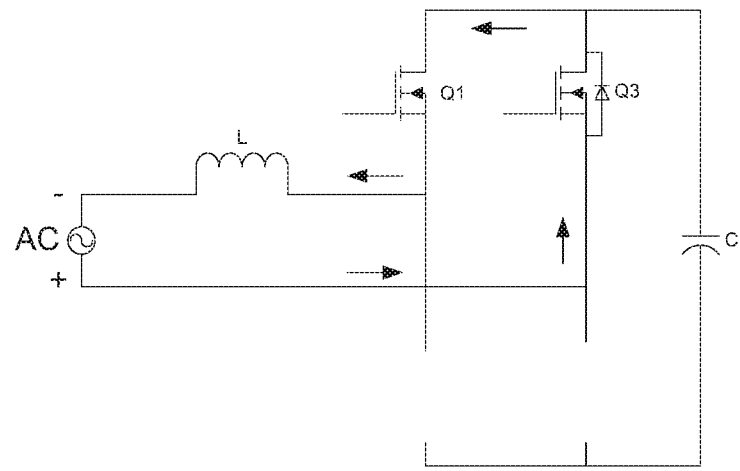
Figure 2E:
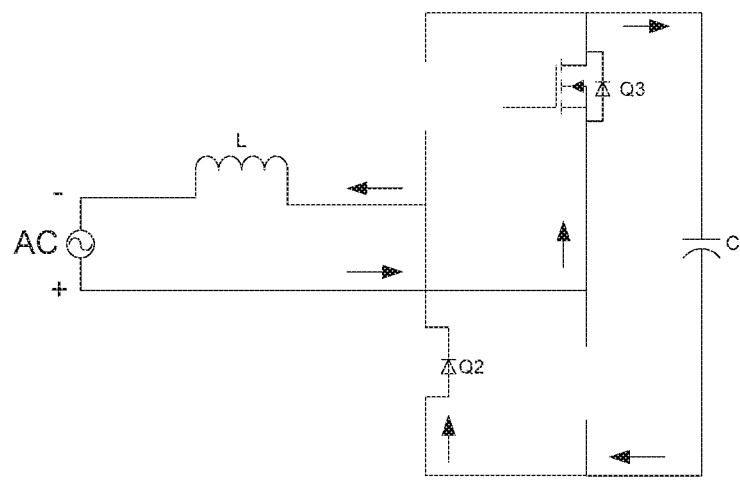
Figure 2F:
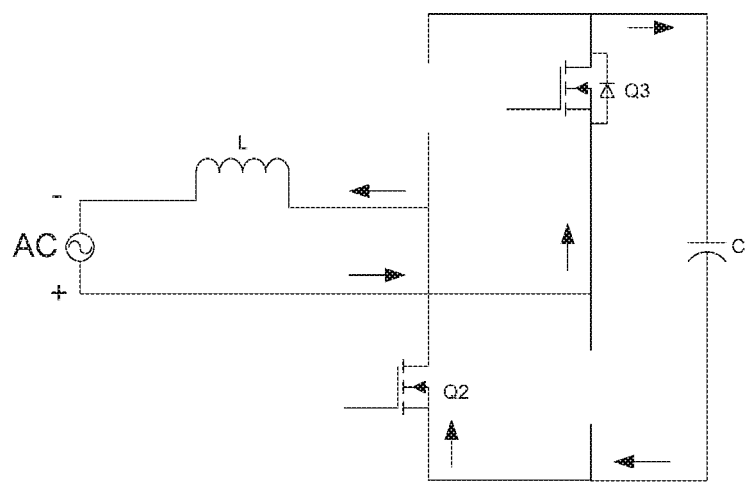

In the seventh embodiment, a method for controlling a PFC device is provided. Referring to FIG. 1, the PFC device includes: a first input terminal and a second input terminal, configured to receive an AC input signal AC which includes alternating positive half-cycle and negative half-cycle; an output terminal configured to provide an output signal to a load; an inductor L, a first terminal of the inductor L being coupled with the first input terminal; a first bridge arm 11, wherein a first terminal of the first bridge arm 11 is coupled with the output terminal, a second terminal of the first bridge arm 11 is directly or indirectly grounded, the first bridge arm 11 includes a first switch component Q1 and a second switch component Q2 which are connected in series, and a first connection point A of the first switch component Q1 and the second switch component Q2 is coupled with a second terminal of the inductor L; and a second bridge arm 12, wherein a first terminal of the second bridge arm 12 is coupled with the output terminal, a second terminal of the second bridge arm 12 is directly or indirectly grounded, the second bridge arm 12 includes a third switch component Q3 and a fourth switch component Q4 which are connected in series, and a second connection point B of the third switch component Q3 and the fourth switch component Q4 is coupled with the second input terminal, and the method may include: sampling a falling edge of an inductor current flowing through the inductor L at least in the negative half-cycle of the AC input signal AC to obtain a sampling result; and generating a switch control signal based on the sampling result to control the first switch component Q1 and the second switch component Q2 to change a switch status.

In a first varied embodiment, the second terminal of the first bridge arm 11 and the second terminal of the second bridge arm 12 are connected at a third connection point, the output terminal is coupled with a first terminal of an output capacitor C, a second terminal of the output capacitor C or the third connection point is grounded, and a sampling point is disposed between the second terminal of the output capacitor C and the third connection point, so that the falling edge of the inductor current is sampled in the negative half-cycle of the AC input signal. Further, the sampling point may further sample the falling edge of the inductor current in the positive half-cycle of the AC input signal. Sampling results obtained in both the positive half-cycle and the negative half-cycle can be used to generate the switch control signal. Such embodiment may be referred to FIG. 3 and the above description related to FIG. 3.

Specifically, when it is detected that the inductor current begins to decrease, sampling is performed at a time point after a predetermined time to obtain the sampling result, a time point at which the first switch component Q1 and the second switch component Q2 change the switch status next time is calculated; and the switch control signal is generated to control the first switch component Q1 and the second switch component Q2 to change the switch status at the time point. A generation process of the switch control signal may be referred to FIG. 5 and the above description related to FIG. 5.

In a second varied embodiment based on the first varied embodiment, it is also possible to detect a current flowing through the first switch component Q1 on a path between the first connection point A and the output terminal. When it is detected that the current flowing through the first switch component Q1 exceeds a first predetermined threshold, the generated switch control signal controls the first switch component Q1 to be turned off for at least a predetermined time to realize over-current protection to the first switch component Q1. Such embodiment may be referred to FIG. 6 and the above description related to FIG. 6.

In a third varied embodiment based on the first or second varied embodiment, it is also possible to detect a current flowing through the second switch component Q2 on a path between the first connection point A and the third connection point. When it is detected that the current flowing through the second switch component Q2 exceeds a second predetermined threshold, the generated switch control signal controls the second switch component Q2 to be turned off for at least a predetermined time to realize over-current protection to the second switch component Q2. Such embodiment may be referred to FIG. 7 and the above description related to FIG. 7.

In a fourth varied embodiment, the sampling point of the falling edge of the inductor current is disposed between the second terminal of the first bridge arm 11 and the second terminal of the second bridge arm 12, and the second terminal of the first bridge arm 11 or the second terminal of the second bridge arm 12 is grounded. The sampling point may sample the falling edge of the inductor current in the negative half-cycle of the AC input signal AC. And in the positive half-cycle of the AC input signal AC, the sampling point may sample the current flowing through the second switch component Q2. When it is detected that the current flowing through the second switch component Q2 exceeds a third predetermined threshold, the generated switch control signal controls the second switch component Q2 to be turned off for at least a predetermined time to realize over-current protection to the second switch component Q2. Such embodiment may be referred to FIG. 8 and the above description related to FIG. 8.

In a fifth varied embodiment based on the fourth varied embodiment, it is also possible to detect the current flowing through the first switch component Q1 on a path between the first connection point A and the output terminal. When it is detected that the current flowing through the first switch component Q1 exceeds a fourth predetermined threshold, the generated switch control signal controls the first switch component Q1 to be turned off for at least a predetermined time to realize over-current protection to the first switch component Q1.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A Power Factor Correction (PFC) device, comprising:
   a first input terminal and a second input terminal, configured to receive an Alternating Current (AC) input signal which comprises alternating positive half-cycle and negative half-cycle;
   an output terminal configured to provide an output signal to a load;
   an inductor, a first terminal of the inductor being coupled with the first input terminal;
   a first bridge arm, wherein a first terminal of the first bridge arm is coupled with the output terminal, a second terminal of the first bridge arm is directly or indirectly grounded, the first bridge arm comprises a first switch component and a second switch component which are connected in series, and a first connection point of the first switch component and the second switch component is coupled with a second terminal of the inductor;
   a second bridge arm, wherein a first terminal of the second bridge arm is coupled with the output terminal, a second terminal of the second bridge arm is directly or indirectly grounded, the second bridge arm comprises a third switch component and a fourth switch component which are connected in series, and a second connection point of the third switch component and the fourth switch component is coupled with the second input terminal;
   a first current sampling unit, wherein at least one terminal of the first current sampling unit is grounded, and the first current sampling unit is configured to sample a falling edge of an inductor current flowing through the inductor at least in the negative half-cycle of the AC input signal to obtain a sampling result; and
   a switch controlling unit, coupled with the first current sampling unit, the first switch component and the second switch component, and configured to generate a switch control signal based on the sampling result to control the first switch component and the second switch component to change a switch status.

2. The device according to claim 1, wherein the second terminal of the first bridge arm and the second terminal of the second bridge arm are connected at a third connection point, the output terminal is coupled with a first terminal of an output capacitor, a second terminal of the output capacitor or the third connection point is grounded, a sampling point of the first current sampling unit is disposed between the second terminal of the output capacitor and the third connection point, and the first current sampling unit is further configured to sample the falling edge of the inductor current in the positive half-cycle of the AC input signal.

3. The device according to claim 2, wherein the first bridge arm further comprises a second current sampling unit, a detection point of the second current sampling unit is disposed between the first connection point and the output terminal, and the second current sampling unit is configured to detect a current flowing through the first switch component,
   wherein the switch controlling unit is further coupled with the second current sampling unit, and when the second current sampling unit detects that the current flowing through the first switch component exceeds a first predetermined threshold, the switch control signal generated by the switch controlling unit controls the first switch component to be turned off for a predetermined time.

4. The device according to claim 3, wherein the second current sampling unit is a non-inductive current sampling unit.

5. The device according to claim 2, wherein the first bridge arm further comprises a third current sampling unit, a detection point of the third current sampling unit is disposed between the first connection point and the third connection point, and the third current sampling unit is configured to detect a current flowing through the second switch component,
   wherein the switch controlling unit is further coupled with the third current sampling unit, and when the third current sampling unit detects that the current flowing through the second switch component exceeds a second predetermined threshold, the switch control signal generated by the switch controlling unit controls the second switch component to be turned off for a predetermined time.

6. The device according to claim 1, wherein a sampling point of the first current sampling unit is disposed between the second terminal of the first bridge arm and the second terminal of the second bridge arm, and the second terminal of the first bridge arm or the second terminal of the second bridge arm is grounded.

7. The device according to claim 6, wherein during the positive half-cycle of the AC input signal, the first current sampling unit is configured to detect a current flowing through the second switch component, and when the first current sampling unit detects that the current flowing through the second switch component exceeds a third predetermined threshold, the switch control signal generated by the switch controlling unit controls the second switch component to be turned off for a predetermined time.

8. The device according to claim 6, wherein the first bridge arm further comprises a second current sampling unit, a detection point of the second current sampling unit is disposed between the first connection point and the output terminal, and the second current sampling unit is configured to detect a current flowing through the first switch component,
wherein the switch controlling unit is further coupled with the second current sampling unit, and when the second current sampling unit detects that the current flowing through the first switch component exceeds a fourth predetermined threshold, the switch control signal generated by the switch controlling unit controls the first switch component to be turned off for a predetermined time.

9. The device according to claim 8, wherein the second current sampling unit is a non-inductive current sampling unit.

10. The device according to claim 1, wherein when the first current sampling unit detects that the inductor current decreases, the switch controlling unit is configured to:
sample at a time point after a predetermined time to obtain the sampling result;
calculate a time point at which the first switch component and the second switch component change the switch status next time; and
generate the switch control signal to control the first switch component and the second switch component to change the switch status at the time point.

11. An electronic device, comprising the Power Factor Correction (PFC) device according to claim 1.

12. A method for controlling a Power Factor Correction (PFC) device, wherein the PFC device comprises:
a first input terminal and a second input terminal, configured to receive an Alternating Current (AC) input signal which comprises alternating positive half-cycle and negative half-cycle;
an output terminal configured to provide an output signal to a load;
an inductor, a first terminal of the inductor being coupled with the first input terminal;
a first bridge arm, wherein a first terminal of the first bridge arm is coupled with the output terminal, a second terminal of the first bridge arm is directly or indirectly grounded, the first bridge arm comprises a first switch component and a second switch component which are connected in series, and a first connection point of the first switch component and the second switch component is coupled with a second terminal of the inductor; and
a second bridge arm, wherein a first terminal of the second bridge arm is coupled with the output terminal, a second terminal of the second bridge arm is directly or indirectly grounded, the second bridge arm comprises a third switch component and a fourth switch component which are connected in series, and a second connection point of the third switch component and the fourth switch component is coupled with the second input terminal; and
the method comprises: sampling a falling edge of an inductor current flowing through the inductor at least in the negative half-cycle of the AC input signal to obtain a sampling result; and generating a switch control signal based on the sampling result to control the first switch component and the second switch component to change a switch status.

13. The method according to claim 12, wherein the second terminal of the first bridge arm and the second terminal of the second bridge arm are connected at a third connection point, the output terminal is coupled with a first terminal of an output capacitor, a second terminal of the output capacitor or the third connection point is grounded, and a sampling point of the falling edge of the inductor current is disposed between the second terminal of the output capacitor and the third connection point, and further configured to sample the falling edge of the inductor current in the positive half-cycle of the AC input signal.

14. The method according to claim 13, further comprising:
detecting a current flowing through the first switch component on a path between the first connection point and the output terminal; and
when it is detected that the current flowing through the first switch component exceeds a first predetermined threshold, the switch control signal controlling the first switch component to be turned off for at least a predetermined time.

15. The method according to claim 13, further comprising:
detecting a current flowing through the second switch component on a path between the first connection point and the third connection point; and
when it is detected that the current flowing through the second switch component exceeds a second predetermined threshold, the switch control signal controlling the second switch component to be turned off for at least a predetermined time.

16. The method according to claim 12, wherein a sampling point of the falling edge of the inductor current is disposed between the second terminal of the first bridge arm and the second terminal of the second bridge arm, and the second terminal of the first bridge arm or the second terminal of the second bridge arm is grounded.

17. The method according to claim 16, wherein in the positive half-cycle of the AC input signal, the sampling point samples the current flowing through the second switch component; and
when it is detected that a current flowing through the second switch component exceeds a third predetermined threshold, the switch control signal controls the second switch component to be turned off for at least a predetermined time.

18. The method according to claim 16, further comprising:
detecting a current flowing through the first switch component on a path between the first connection point and the output terminal; and
when it is detected that the current flowing through the first switch component exceeds a fourth predetermined threshold, the switch control signal controlling the first switch component to be turned off for at least a predetermined time.

19. The method according to claim 12, further comprising:
   when it is detected that the inductor current begins to decrease, sampling at a time point after a predetermined time to obtain the sampling result;
   calculating a time point at which the first switch component and the second switch component change the switch status next time; and
   generating the switch control signal to control the first switch component and the second switch component to change the switch status at the time point.

* * * * *